June 2, 1931. E. W. RITTER 1,808,479
STOKER
Filed Sept. 28, 1925 9 Sheets-Sheet 1
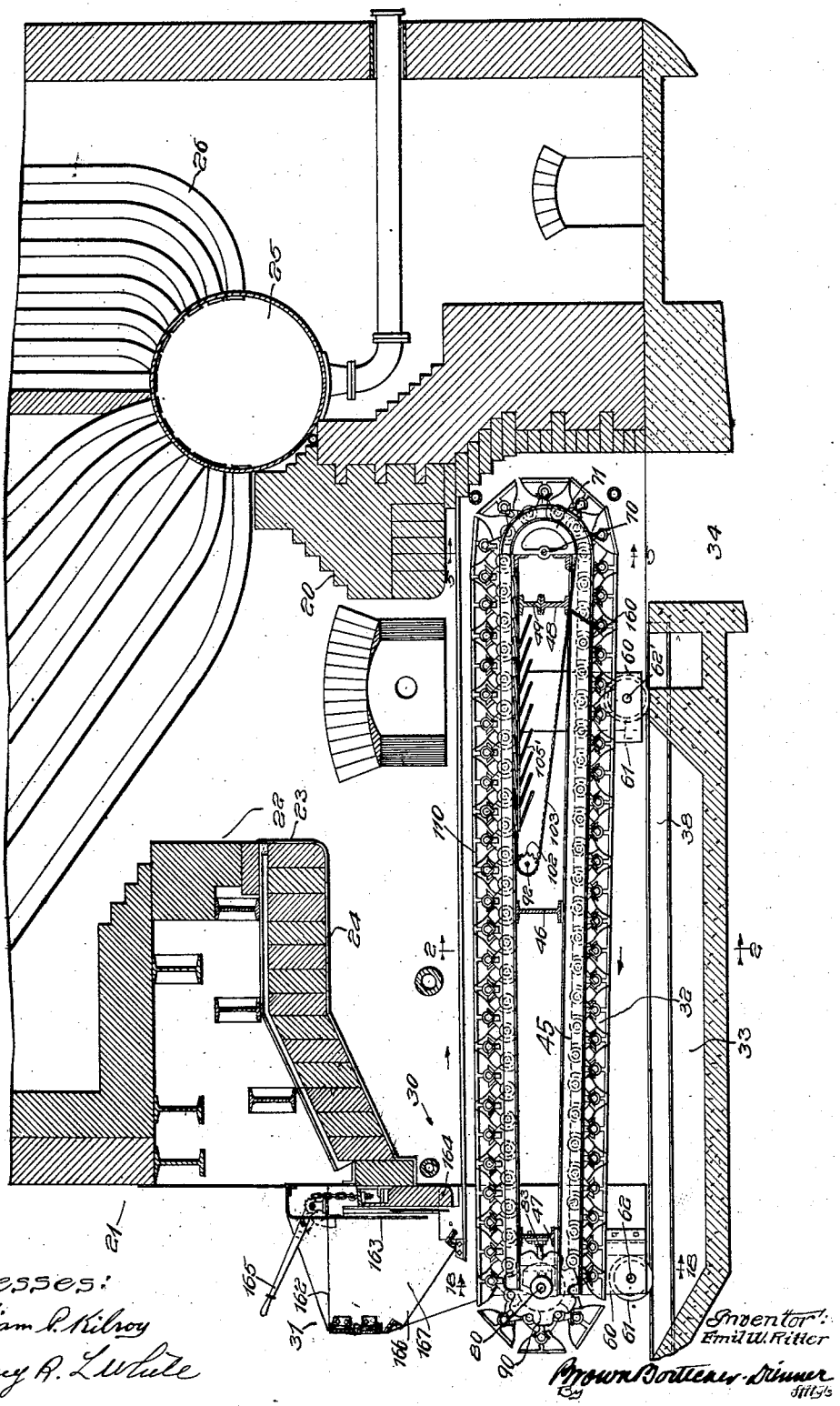

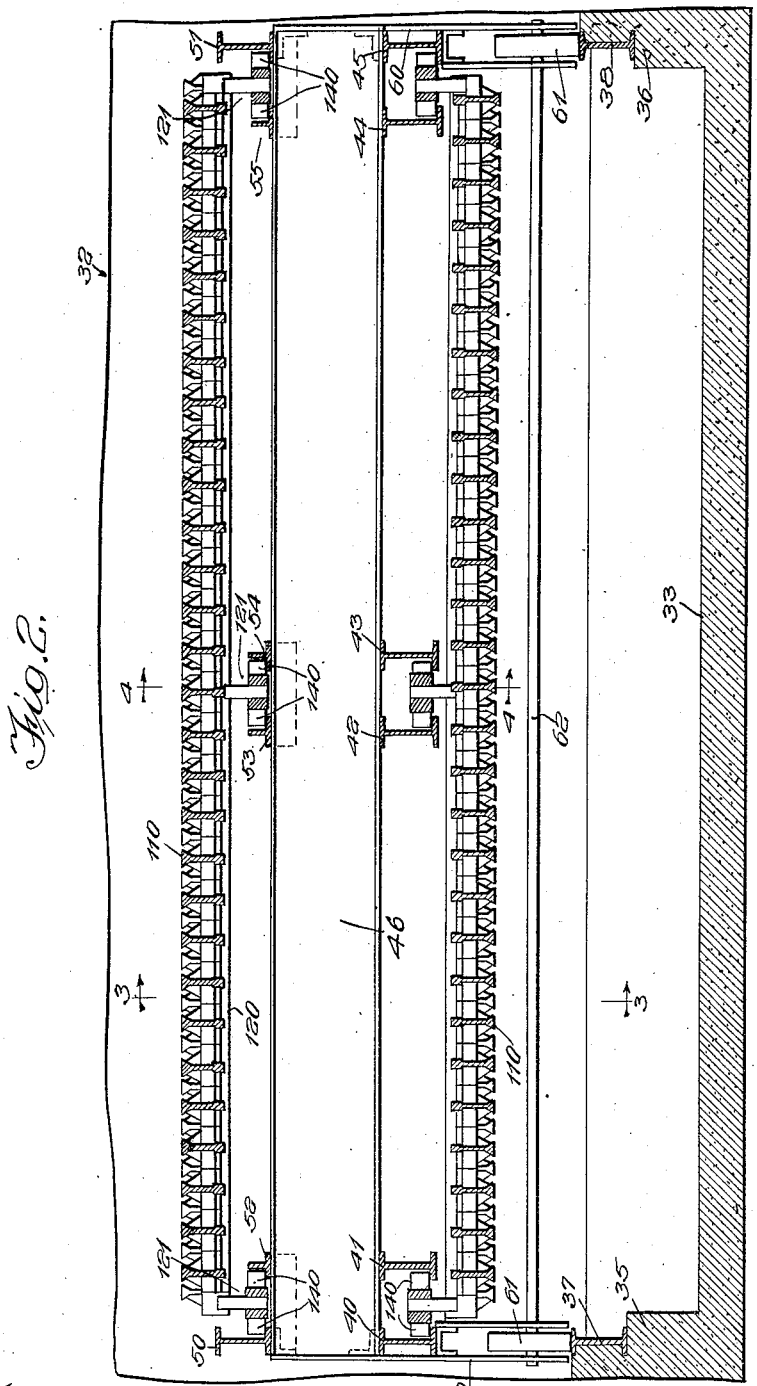

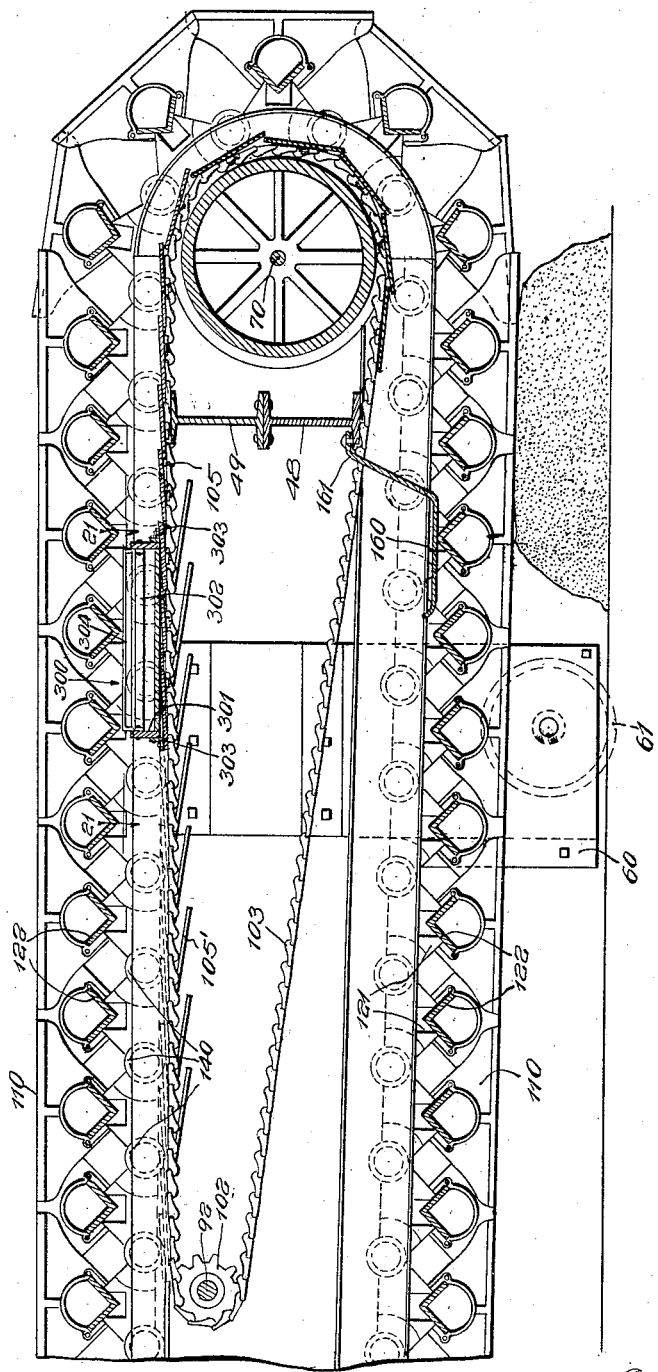

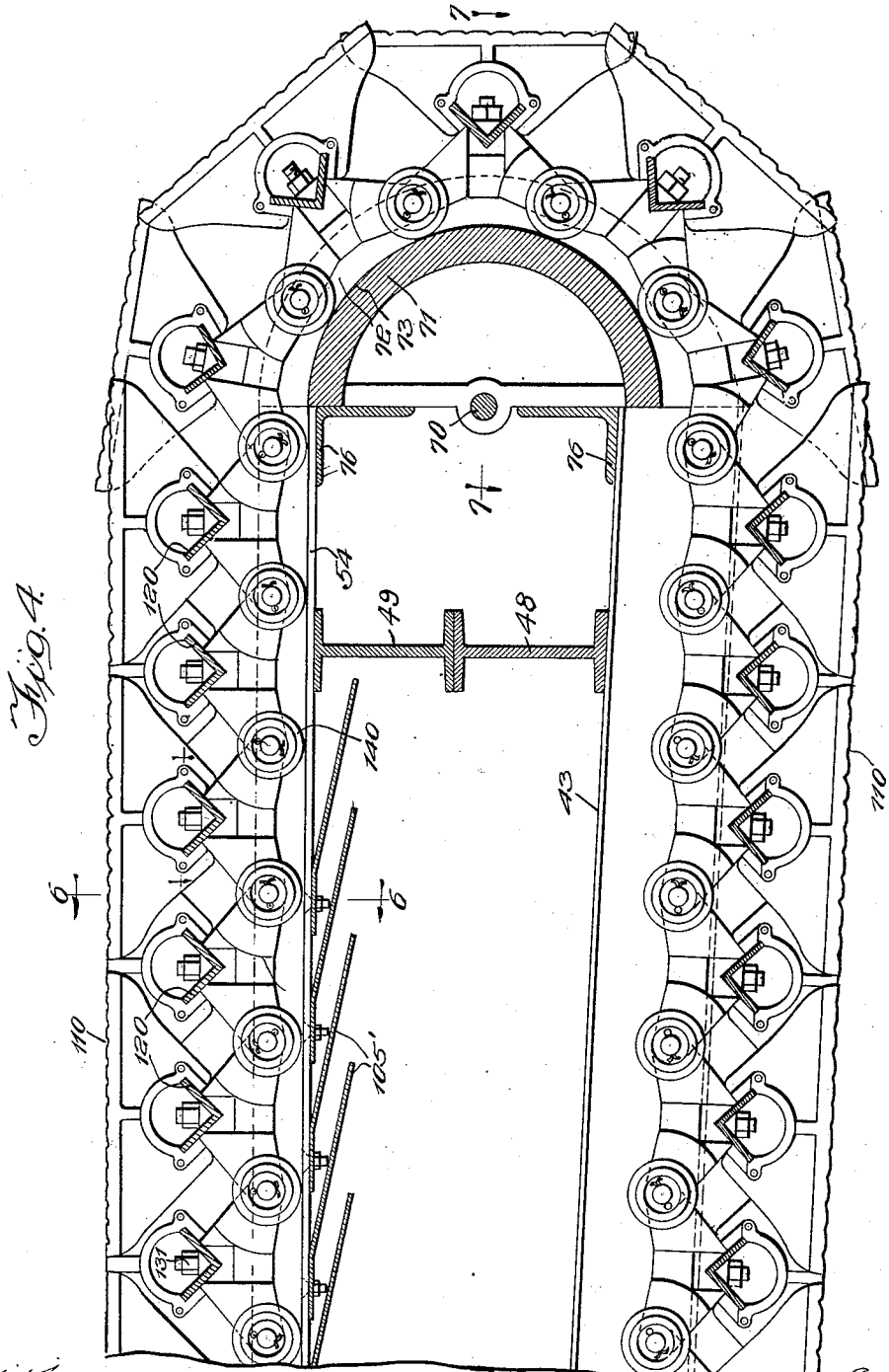

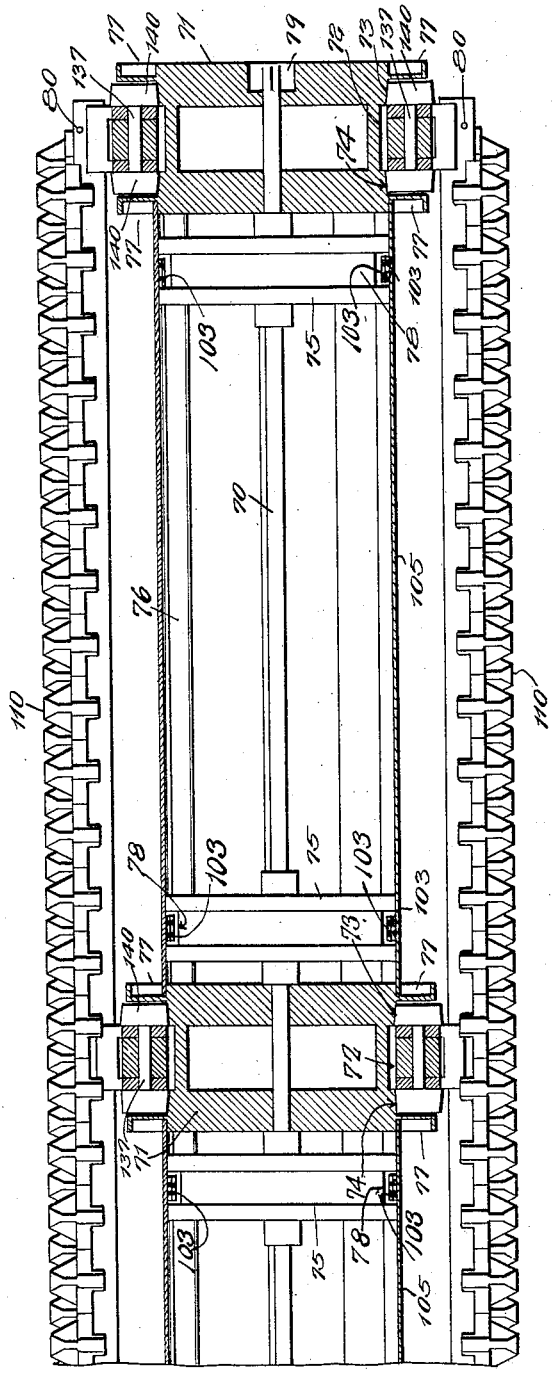

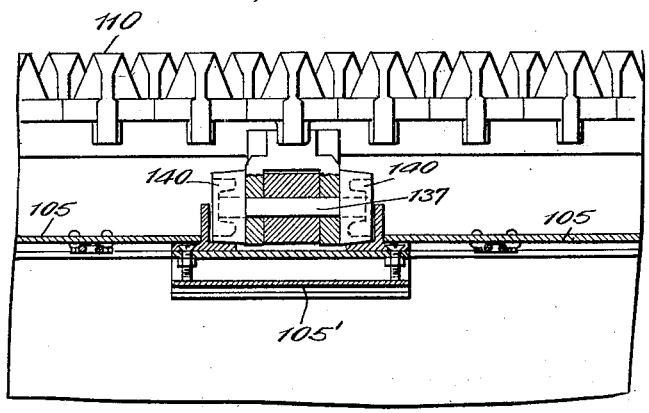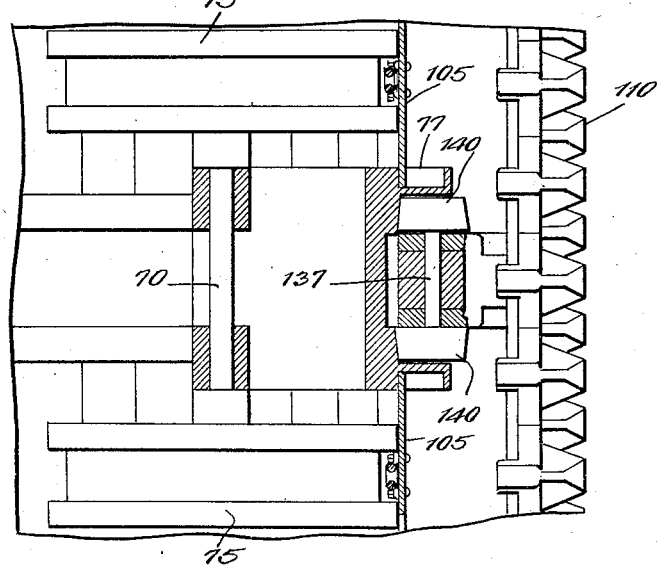

June 2, 1931. E. W. RITTER 1,808,479
STOKER
Filed Sept. 28, 1925 9 Sheets-Sheet 7

Witnesses:
William P. Kilroy
Harry L. White

Inventor:
Emil W. Ritter
Brown Boettcher Dienner
Attys

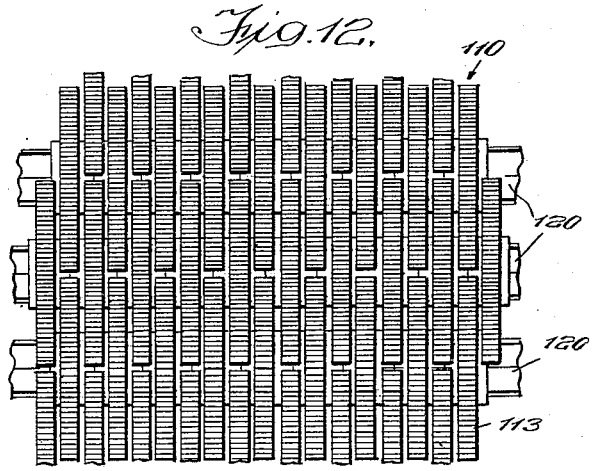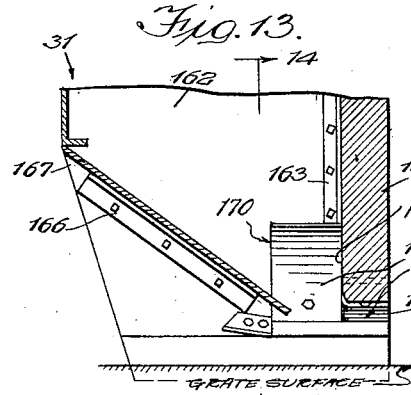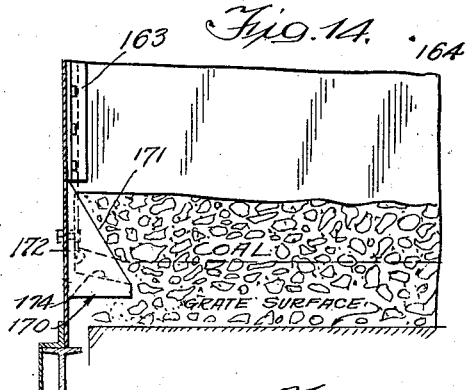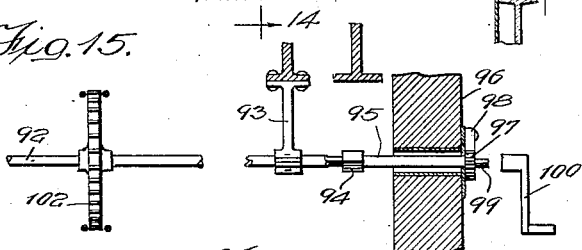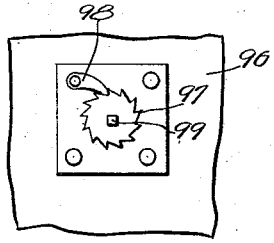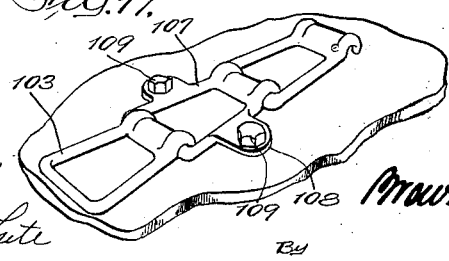

June 2, 1931. E. W. RITTER 1,808,479
STOKER
Filed Sept. 28, 1925 9 Sheets-Sheet 9
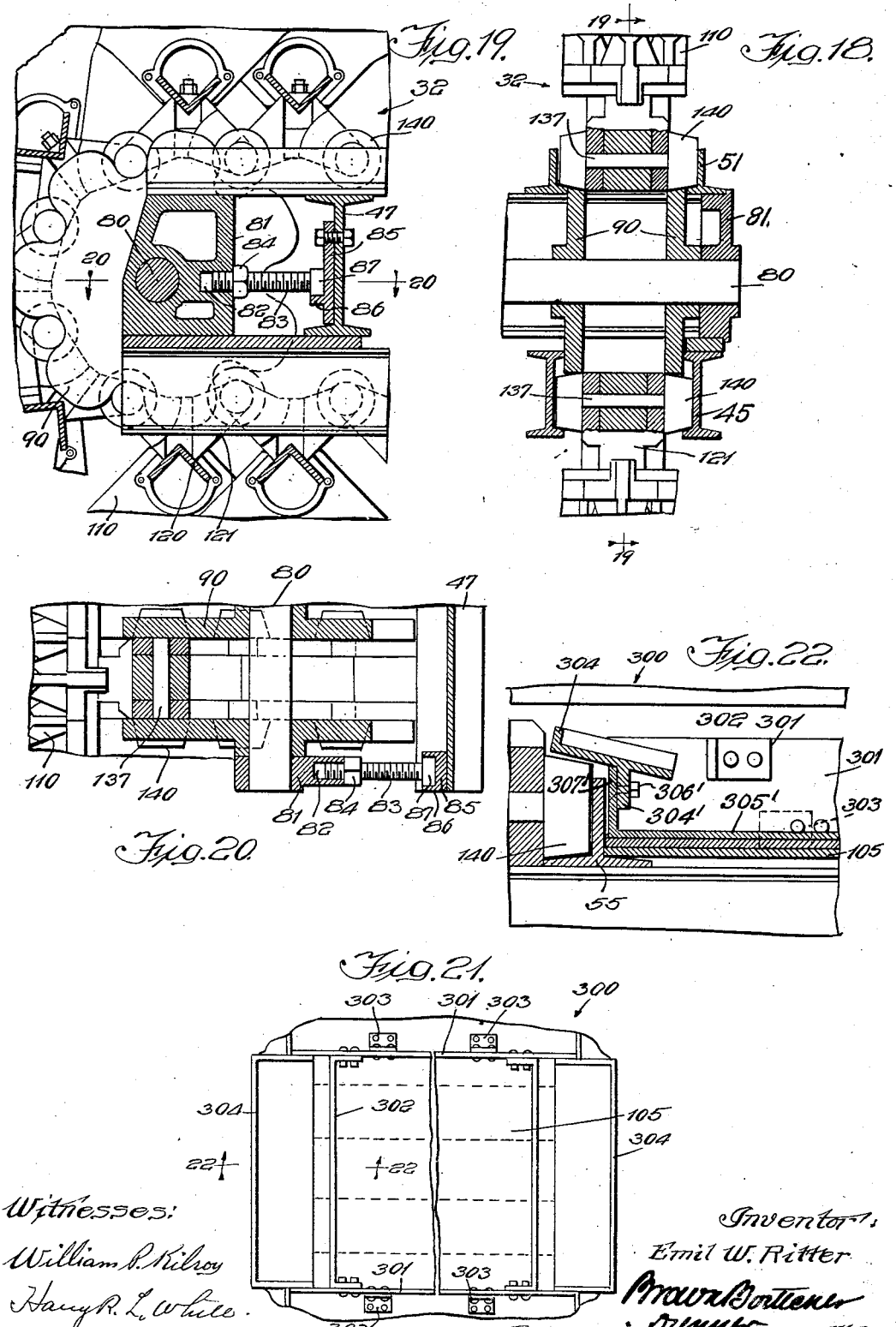

Patented June 2, 1931

1,808,479

UNITED STATES PATENT OFFICE

EMIL W. RITTER, OF CHICAGO, ILLINOIS, ASSIGNOR, BY MESNE ASSIGNMENTS, TO BURKE STOKER & MFG. CO., OF CHICAGO, ILLINOIS, A CORPORATION OF ILLINOIS

STOKER

Application filed September 28, 1925. Serial No. 58,995.

My invention relates generally to mechanical stokers and more particularly to mechanical or traveling grates. More specifically, the present invention has reference to improved grate bars and their arrangement in traveling grates.

In the operation of traveling grates, it is well known to those familiar with the present art that considerable difficulty is experienced in removing and replacing the bars of the grates.

I propose, in accordance with the general features of the present invention, to provide an improved grate bar of such a construction that it may be removed from the grate and replaced with facility. I also propose to provide a bar which has the following desirable qualities and features:

First, my bar is one that may be economically manufactured by the simple process of casting in the open sand of the foundry.

Secondly, a bar embodied with the features of the present invention furnishes adequate support to the fuel or coal upon it, and at the same time, permits the access of air through it from below. It is, of course, obvious that this air is depended on to keep the bars cool, as well as to furnish the oxygen for the combustion of the fuel.

Thirdly, my bar is of such a type that it will not warp under the unequal temperature of its upper and lower sides. The bar is also of such a construction that warping both vertically and sidewise is prevented.

Fourthly, it will be found that when bars of the kind I disclose are assembled into the grate, the grate surface may be, with facility, cleaned from ashes and clinkers. The bars made in accordance with the present invention are, like a great many bars of the present day, wedge-like in cross section, with the broad back up, so as to permit any solid matter which may pass through the openings intermediate the bars to go the rest of the way and fall into the ash pit below the grate.

Fifthly, my bar is strong enough to carry the load caused by the weight of the fuel without sagging or breaking even when the grate surface is red hot. I accomplish this by giving considerable depth vertically to the bar, so that the bottom side of it, which is met by the incoming cooled air, shall be quite a distance away from the hot surface of the top, which will warm it by conduction.

Sixthly, the bars made in accordance with the present invention, are adapted to be interlocked in a novel manner. This interlocking feature, as far as I am aware, is an entirely new one and is believed to be of great practical value in the grate art, inasmuch as it enables the bars to remain properly aligned.

The bars comprising the grate surface of my improved grate are arranged in rows so that one-half of each of the bars in each row projects approximately to the center line of the adjacent row of bars on one side thereof and the other half of each bar projects approximately to the center line of the adjacent row of bars on the other side thereof. When traveling around an end of the grate, each row of bars or clips must necessarily move relative to the adjacent rows due to the curved or arcuate path over which the bars must move. In other words, the bars spread apart. That is to say, the bars of each row separate from the bars of the adjacent rows and no longer extend to the center of the adjacent row. This results in ashes or clinkers adhering to the grate surface being disengaged therefrom and caused to gravitate into the ash pit.

I find it advisable to make the discharge end of the grate of such radius as not to provide too sharp a bend for the bars to travel over for to do so would result in the ends of the bars separating. This is not desirable for should a bar separate from the adjacent bar, the clinkers or discharging ash might be discharged from the grate bars on their carrier bars with the result that the grate bars would not re-enter into mesh, causing stoppage or breakage. The best results are attainable by causing the rows of bars to separate as far as possible without causing the ends of the bars to withdraw completely from their overlapped positions with respect to the bars of the adjacent rows.

On the other hand, it is desirable to cause each row of bars to separate completely from the adjacent row of bars at the forward end of the grate so as to facilitate the removal and replacement of the bars.

I accomplish both of the desired features by making the rear or discharge end of sufficiently greater radius than the forward end of the grate, thus providing a sharp bend at the front end of the grate and a large bend at the rear end.

It is desirable, in order to insure proper combustion of the fuel within the furnace that the air through the grate be controlled whether it be admitted through the medium of a natural draft or a forced draft. Obviously, at the ash end of the grate there are times when practically no air need be admitted therethrough inasmuch as all that remains of the fuel on the grate is ash. That is to say, on the surface of the inner end of the grate, no combustible material remains to be burned and hence no oxygen is needed at this point. I, therefore, propose to provide a novel shutter means carried by the grate for controlling the air admitted therethrough. This naturally tends to secure a more complete combustion of the fuel, including both solid matter and gases, within the furnace thereby increasing the efficiency of the furnace itself. As will become more apparent hereinafter, the air controlling means is adapted to be adjusted in accordance with the conditions of the fuel on the grate surface. This is a very desirable feature, since conditions existent within a furnance vary with the type of fuel being consumed and the amount of air prevalent within the furnace.

Another feature of the present invention is the provision of baffle-like plates on the grate bar carrying means which are adapted to cooperate with the air controlling means to prevent air from being forced up through the carrying means.

In the usual type of stoker, a fuel hopper is located at the forward end of the traveling grate from which fuel is supplied to the furnace. The hopper includes an adjustable feed gate for regulating the amount of fuel admitted into the furnace. This damper as is known to those familiar with such a hopper is mounted in a vertical position and is guided by the side plates of the hopper. I have found that due to the intense heat existing in the furnace and due to the flames playing on the lower ends of the side plates the ends of the side plates tend to wear out very quickly.

I propose to obviate this condition by equipping the lower ends of each of the side plates with a removable cast iron guide block or shoe which not only serves to protect the side plates of the hopper, but provides a guiding means for the lower end of the feed gate. Moreover, these shoes or blocks are of such a design that they prevent any of the fuel, such as coal, from falling down the sides of the grate into the pit when the coal is first admitted onto the grate. In other words, these blocks tend to guide the fuel from the hopper onto the grate.

The principal object of the present invention is to provide an improved stoker.

Another object of the present invention is to provide an improved mechanical or travelling grate.

Still another object of the present invention is to provide grate bars of such a construction that they may be removed and replaced with facility from the grate proper.

A further object of the present invention is to provide means associated with the grate for controlling the air admitted therethrough into the furnace.

A still further object of the present invention is to improve the construction of the hopper associated with the grate.

Other objects and advantages of the present invention will more fully appear from the following detailed description taken in connection with the accompanying drawings, which illustrate one embodiment thereof and in which;

Figure 1 is a diagrammatic sectional view of a portion of the furnace showing the arrangement of the stoker therein and a portion of the boiler setting;

Fig. 2 is an enlarged fragmentary sectional view taken on the line 2—2 of the grate illustrated in Figure 1;

Fig. 3 is an enlarged fragmentary sectional view taken on the line 3—3 of Figure 2;

Fig. 4 is an enlarged fragmentary sectional view taken on the line 4—4 of Figure 2;

Fig. 5 is an enlarged sectional view taken on the line 5—5 of Figure 1;

Fig. 6 is a fragmentary and irregular sectional view taken on approximately a line 6—6 of Figure 4;

Fig. 7 is a fragmentary and irregular sectional view taken on approximately a line 7—7 of Figure 4;

Fig. 12 is a fragmentary plan view of a portion of the grate surface showing the manner in which the grate bars are staggered with respect to each other;

Fig. 13 is a sectional view through the hopper showing one of the side plates thereof and illustrating the manner in which my novel shoe is applied thereto;

Fig. 14 is a fragmentary sectional view taken on a line 14—14 of Figure 13, showing how my novel shoe block prevents fuel from passing down along the sides of the grate;

Fig. 15 is a diagrammatic view, illustrating the sprocket mechanism for operating the air control shutter mechanism mounted in the grate;

Fig. 16 is a fragmentary view illustrating the pawl and ratchet mechanism for maintaining the sprocket wheels in the position in which they are set;

Fig. 17 is a view illustrating the manner in which the sprocket chains are secured to the valve shutters or slats;

Fig. 18 is an enlarged fragmentary sectional view taken on the line 18—18 of Fig. 1;

Fig. 19 is a fragmentary sectional view taken on the line 19—19 of Fig. 18 looking in the direction indicated by the arrows;

Fig. 20 is a fragmentary sectional view taken on the line 20—20 of Fig. 19 looking downwardly;

Fig. 21 is an enlarged fragmentary view taken on the line 21—21 of Fig. 3 looking downwardly illustrating my novel sealing means; and Fig. 22 is a fragmentary sectional view taken on the line 22—22 of Fig. 21.

Figure 8:
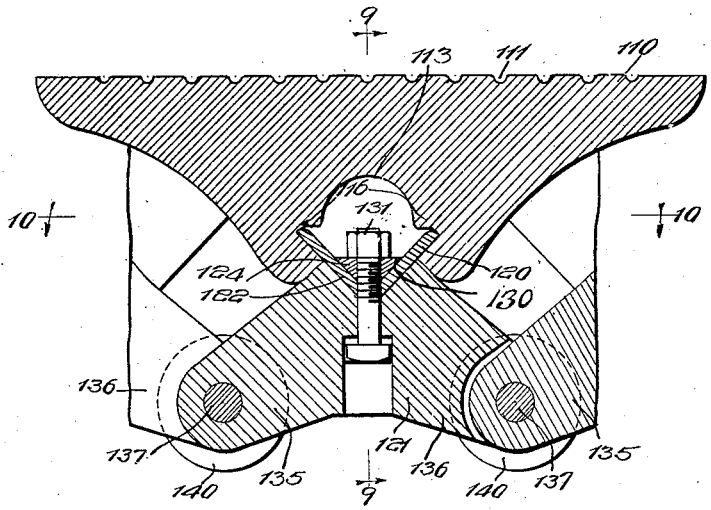
Fig. 8 is an enlarged sectional view of one of the grate bars showing the manner in which it is mounted upon an angle bar. This view also illustrates in section one of the links for carrying the angle bar.

Referring now to the drawings in detail, in which like reference numerals designate similar parts throughout the several views, 20 denotes the rear wall portion of a furnace hereinafter represented generally by the reference numeral 21 which may be of any suitable or usual construction. The furnace 21 has a front wall 22 which comprises a vertical portion 23 and an arch 24. The boiler setting may be of any desirable type. The reference numeral 25 denotes a boiler and reference numeral 26 designates boiler tubes. Disposed in the lower part of the furnace is a stoker hereinafter referred to generally by reference numeral 30 which comprises essentially a hopper 31 and a traveling grate 32. Situated below the traveling grate 32 is a pit 33 and located directly below the innermost or discharge end of the grate is a passage 34 which connects with an ash pit (not shown).

The present invention is concerned primarily with the traveling grate 32 of the stoker 30. It should be noted, at this time that the innermost or discharge end of the grate has a greater radius than the outer or exposed end of the grate. The purpose of this will be more fully explained hereinafter. The pit 33 is provided with a pair of ledges 35 and 36 (Fig. 2) upon which are located longitudinal I beams 37 and 38, respectively. I shall hereinafter refer to the beams 37 and 38 as tracks. The grate 32 includes longitudinal I beams 40, 41, 42, 43, 44 and 45. The beams 40 and 45 are disposed directly over the tracks 37 and 38, respectively. Positioned above and on the aforesaid six longitudinal beams of the grate, intermediate their ends, is an I beam 46 which I shall hereinafter refer to as a transverse beam.

Referring now, back to Figure 1, it will be noted that at the forward end of the grate is a transverse I beam 47, which is supported upon the forward ends of the six parallel longitudinal I beams referred to above. Similarly positioned upon these longitudinal beams 40, 41, 42, 43, 44 and 45 at the discharge or inner end of the grate is a transverse I beam 48. This transverse beam 48 supports another transverse I beam 49 which is secured thereto in any suitable manner. All of the transverse I beams are parallel to each other. The transverse beam 46 is larger in width than the transverse beam 47 and the two beams 48 and 49 taken together are wider than the beam 46. The longitudinal I beams are not parallel to the tracks 37 and 38, but slant downwardly from the forward end of the grate to the rear end of the grate. All of the lower longitudinal beams are fastened to the transverse beams thus providing a very compact and simple framework construction.

As shown in Figure 2, the beams 42 and 43 are disposed at the approximate center or longitudinal center of the grate, so as to afford adequate support to the grate surface thereby preventing it from sagging. Disposed directly above the beam 40 (Fig. 2) and supported upon the transverse beams 46, 47 and 49 is a longitudinal I beam 50. Similarly disposed upon the transverse beams directly above the beam 45 is a longitudinal I beam 51. Both beams 50 and 51 are suitably bolted to the transverse beams. Supported by and secured to the transverse beams and directly above the longitudinal beams 41, 42, 43, and 44 are the longitudinal beams 52, 53, 54 and 55, respectively.

It should be noted that the beams 50 to 55, inclusive, are parallel to the tracks 37 and 38 as well as to the base of the furnace. The upper and lower longitudinal beams and the transverse beams when assembled together constitute the primary portion of the frame of the traveling grate. As illustrated in Figures 2 and 3, wheel carrying members 60 are suitably attached to the longitudinal channel bars on each side of the traveling grate. There are preferably two of these members on each side of the frame of the grate. On one side (Fig. 2) they are suitably attached to the longitudinal beams 40 and 50 and on the other side they are suitably attached to the longitudinal beams 45 and 51. Each member 60 has positioned within it a wheel 61, which is adapted to ride on the associated track. One set of wheels 61 is located at the forward end of the grate and another set is located at the rear end of the grate. The wheels 61 of the forward end are mounted on the common shaft 62, as shown in Figure 2 and the rear wheels are mounted similarly on a common shaft 62' (Fig. 1). These wheels 61 enable the traveling grate to be rolled in and out of the furnace as the case may be upon the tracks 37 and 38.

The lower longitudinal I beams slant downwardly from the forward part of the grate to the rear end of the grate and hence are not parallel to the upper longitudinal I beams of the grate. This results in the forward end of the grate being not as high as the rear end of the grate. The I beams 40 and 41 (Fig. 2) are spaced a given distance. The I beams 42 and 43 as well as I beams 44 and 45 are spaced the same distance apart as I beams 40 and 41. The three pairs of beams above the lower longitudinal beams are spaced the same distances apart as the lower beams. That is to say, each upper pair of longitudinal beams is directly over the lower pair.

Located intermediate the extremities of the upper and lower longitudinal beams at the discharge end of the grate is a transverse shaft 70 (Fig. 1) which is journaled in three semi-circular members 71 (Fig. 5). Two only of these members are illustrated in Figure 5, inasmuch as the third one is identically the same as the one on the right in that figure. The two outer members 71 are adapted to cooperate with the outer pairs of longitudinal beams whereas the middle member 71 is adapted to cooperate with the middle pairs of beams illustrated in Figure 2. Each of the members 71 is provided with a peripheral groove 72, which is formed into a pair of peripheral tracks 73 and 74 (Fig. 5). These tracks 73 and 74 connect the bottom flanges of the upper longitudinal beams with the bottom flanges of the lower longitudinal beams, to provide a continuous trackway.

Mounted on the shaft 70 and spaced a given distance from each other are two pair of pulleys 75 which are integral with the shaft 70. The members 71, however, are not integral with the shaft 70, but are secured to their associated longitudinal beams by suitable anchor or angle members, such as that indicated by reference numeral 76 in Figure 4. Each of the members 71 is provided on each of its two faces with a semi-annular groove 77. Each of the pulleys 75 is equipped with an annular groove 78. The end of the shaft 70 is formed square and each of the end members 71 is provided with a socket 79 (Fig. 5) for permitting an instrument such as a crank or handle to be inserted therein to turn the shaft 70 whenever it is so desired.

Positioned at the forward or outer end of the grate frame intermediate the extremities of the longitudinal beams, is a power driven shaft 80 which is parallel to the shaft 70. This shaft 80 is journaled in suitable bearing members 81, mounted intermediate the upper and lower longitudinal beams. The bearing members 81 (Fig. 19) are each provided with a threaded bore 82 into which an end of a bolt 83 is screwed. The bolt 83 carries a lock nut 84 adapted to be screwed tightly against the bearing member. Secured to the transverse I beam 47 are a plurality of vertical members 85, each being equipped with a cage 86 in which the head 87 of one of the bolts 83 is held in place. This construction enables the bearing members 81 to be, at all times, held rigidly in place and in alinement.

Mounted on and secured to the shaft 80, in any suitable manner, are three pairs of gear-like wheels 90 (Fig. 20) spaced in such a manner as to be adapted to cooperate with the three pairs of trackways formed by the longitudinal beams. Each pair of the gear-like wheels 90 is in alinement with one of the semi-circular members 71 at the other end of the grate.

Located intermediate the ends of the traveling grate adjacent to and parallel with the I beam 46 is a sprocket shaft 92 (Figs. 1 and 3) revolvably mounted in bearing members 93 (Fig. 15) suitably carried by the longitudinal beams of the traveling grate. The end of the shaft 92 (Fig. 15) is square in its cross section and projects into a socket 94 carried by a small shaft 95 journaled in the plate 96 suitably attached to the longitudinal beams. Formed on the outer end of the shaft 95 is a ratchet wheel 97 which is engaged by a pawl 98 (Fig. 16) attached to the plate 96. The outer end of the shaft 95, indicated by reference numeral 99, is square in cross section and is adapted to be engaged by a handle 100 equipped with a square aperture. Obviously, by placing the handle on the end of the shaft 93 and by turning the handle 100, sprocket shaft 92 may be turned.

The sprocket shaft 92 carries four sprocket wheels 102 each of which is in alinement with one of the four pulleys 75 which are loose on the shaft 70. Each of the sprocket wheels 102 is connected by a sprocket chain 103 with its associated pulley, the sprocket chain 103 being adapted to travel in the peripheral groove 78 of the pulley. Each pair of chains 103 (Figs. 3 and 5) carries a plurality of transverse shutters or slats the ends of which are adapted to ride on the peripheries of the pulleys 75. These slats are indicated by reference numeral 105, in Figure 5, and are secured to the chains thereunder in any suitable manner. In Figure 17, I have illustrated one manner by which the links of the chain may be rigidly fastened to the slats. It consists essentially in providing the links 107 of the chains with flanges 108 which are secured to each slat by bolts 109. It should be noted that the ends of the slats 105 (Fig. 5) are adapted to lie on the flanges of the associated grooves 77 of the members 71. This is to insure against any air passing through the discharge or ash end of the grate, as will be more fully explained in the operation of the mechanism.

In Figures 21 and 22 I have illustrated on a somewhat enlarged scale what I term my novel sealing means which is designated generally by reference numeral 300. As shown in Fig. 3, this sealing means comprises two upright transverse sheets of metal 301 bolted to longitudinal connecting members 302. These connected sheets are mounted on top of the last few transverse slats or shutters 105 and are secured thereto in any suitable manner as by angle pieces 303 (Figs. 21 and 22). Projecting laterally from the sheets 301 and at an angle thereto are what I term a pair of trough-like members 304 which are each provided with a projection 304' secured by a bolt 306' to the turned up portion 307' of a bottom plate 305'. This plate 305' is disposed over the slats 105 intermediate the sheets 301. The projecting ends of these members, as shown in Fig. 22, are parallel to the rollers 140 and are in proximity thereto. In fact, it is necessary that these wing members lie as close to the rollers thereunder as practical so as to minimize the possibility of air getting through the grate by following the space separating the grate surface and the slats 105.

The spaces enclosed by the sheets 301 on the slats 105 may be filled with any suitable filling medium as for example, ashes. This forms a very effective seal against the air, as I shall now describe.

It is evident that although the slats or shutters 105 prevent the air from passing through the grate surface at the rear end of the grate (Fig. 3) there is a marked tendency for some of the air passing through other portions of the grate to enter the space separating the grate surface or upper grate bars and the slats 105. Naturally, such air due to the draft existent within the furnace will follow the top surface of the slats until it has all passed through the grate surface at the rear end of the grate. Of course, this would frustrate the very purpose of the slats or shutters 105. Obviously, in order to eliminate this undesirable condition some means must be devised for cooperating with the slats in preventing the air from passing over them. I find by placing such a sealing means as I have already described on top of the last few shutters 105 (Fig. 3) that the aforementioned undesirable condition is obviated. That is to say, air is prevented from getting between the slats 105 and the adjacent grate surface thereby making the shutters effective in the performance of their function.

Figure 11:
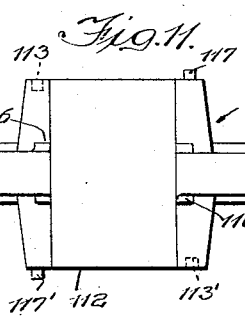
Fig. 11 is a bottom plan view of one of the grate bars.

I shall now proceed to describe in detail my novel grate bars and their associated links, which, when secured end to end form an endless chain. In Fig. 11, I have illustrated a grate bar 110 looking from its underside embodied with the features of the present invention. As thus shown, in Figure 8, the bar 110 is provided with a plurality of serrations or notches 111 on its top surface. The bar 110 is preferably wedge-shape as viewed in the section shown in Fig. 8, which construction has been found to be the most desirable one in the traveling grate art. Each bar 110 is formed with an enlarged central hub-like portion 112, which has an arcuate shaped recess 113. The hub-like portion 112, is connected to the top surface 114 of the grate by webs 115. The longitudinal webs 115 (Figure 11) terminate in angular grooves 116, the legs of which are at right angles to each other. One edge of the hub-like portion 112 is provided with a projection 117 and a small aperture 113. The other edge of the portion 112 is provided with a projection 117' which is directly opposite aperture 113 and is also provided with an aperture 113' which is directly opposite the projection 117. These projections and apertures are adapted to cooperate with the projections and apertures of the adjacent grate bars to provide a compact and rigid grate as will be found more apparent hereinafter.

The bars 110 are adapted to be slid on right angle bars 120 (Figure 8) the legs of the right angle bar 120 fitting in the angular slots 116 of each grate bar. The grate bars mounted on the right angle bars in this manner cannot be removed by pulling them upwardly, but have to be removed by being slid transversely off the bar 120. The bars 120, are mounted transversely of the traveling grate and are carried by links 121 which shall now be described in detail.

Each link 121 is provided with a centrally disposed right angle slot 122 (Figure 8) in which the right angle bar 120 rests, and with a centrally disposed aperture 123 which terminates in bore 124 communicating with the vertex of the right angle slot 122. Referring now, more particularly to Figure 9, it will be noted that the aperture 123 is sufficiently wide enough to permit a bolt 125 to be passed therethrough. The bolt when in its position has its head 126 resting upon a shoulder 127 of the aperture 123. The shank of the bolt extends up through bore 124 and through an aperture 128 in the right angle bar 120. The shank of the bolt also passes through a small right angle-shaped block 130, seated between the legs of bar 120. A nut 131 is threaded upon the upper end of the shank and is adapted to rigidly hold the angle bar 120 to the link 121. The recess above the shoulder 127 provides a square pocket for holding the square head 126 of bolt 125 from turning. This constitutes a non-circular head and corresponding pocket to prevent the bolt head or a nut disposed thereon from turning. The shoulder keeps bolt 127 from falling out even though link 121 should be removed.

Figure 9:
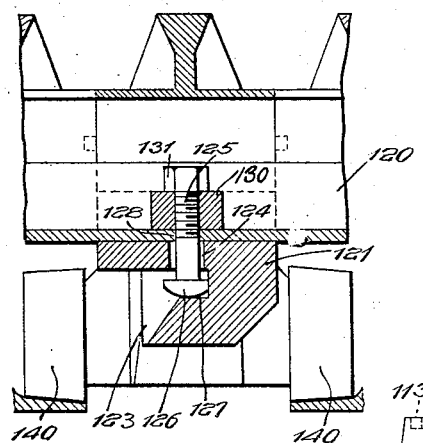
Fig. 9 is a sectional view taken on a line 9—9 of Figure 8, illustrating the manner in which the angle bar is secured to the links.
Figure 10:
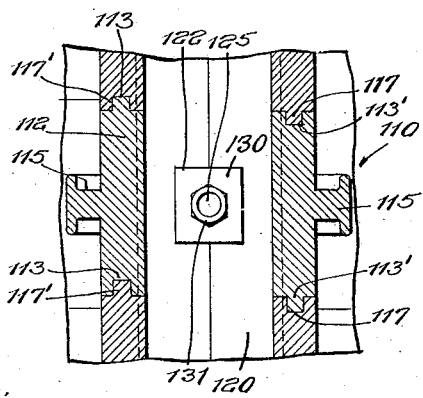
Fig. 10 is a fragmentary sectional view taken on a line 10—10 of Figure 8.

Each link 121 has a single leg 135 on one side and a pair of legs 136 on the other side, as shown clearly in Figs. 8 and 9. The legs 136, in reality, comprise one large bifurcated leg. The end of leg 135 of each link is adapted to project into the space separating the legs 136 of the adjacent link. Also, the legs 136 or the large bifurcated leg of each link, is adapted to receive the end of the leg 135 of the adjacent link as shown in Figure 8. The leg 135 of each link is pivotally secured to the legs 136 of the adjacent link by a pin 137.

Each of the links 121 consists of a single casting. They may be made from cast iron very cheaply by moulding in multiple from a match-plate or squeezer pattern. Each of the grate bars 110 also are preferably made of cast iron in a similar manner.

Suitably mounted on the ends of each pin 137 (Fig. 9) are rollers 140. These rollers are adapted to ride in the previously mentioned trackways furnished by the longitudinal beams as well as in the peripheral grooves of the members 71. At the forward end of the traveling grate, these rollers are adapted to be received by the teeth of the gear-like wheels 90, which carry the rollers and the associated links and grate bars from the lower longitudinal beams to the upper longitudinal beams of the grate (Fig. 19).

Referring now to Figure 12, it should be noted that the grate bars 110 are mounted in a spaced relationship upon the right angle bars 120. The distance between the alternate rows of the bars 110 is a little greater than the width of the top of one bar so as to provide clearance between adjacent rows. The transverse angle bars 120 are also spaced from each other on the top of the frame work of the grate. The distance between the vertex of each angle bar 120 and the vertexes of the adjacent angle bars 120 is equal to approximately one-half the length of the top 113 of a grate bar 110. Hence, it will be seen in Figure 12, that the space between each pair of grate bars on angle bars 120 is occupied by one-half of a grate bar projecting from an adjacent angle bar 120 one side thereof and by one-half of another grate bar projecting from another adjacent angle bar 120 on the other side. This results in a staggered relationship between the bars 110.

The staggered relationship of the grate bars is a very desirable feature, since when the traveling grate surrounds the inner ends of the grate proper, all ashes and clinkers are enabled to fall from the grate due to the opening up of the bars. Also, as is apparent in Figure 1, this staggered relationship causes the rows of grate bars to be completely separated from each other at the forward end of the grate, thereby permitting removals and replacements of deteriorated or broken bars.

Suitably supported and carried by the transverse I beam 48 (Figure 3) is an angular member 160 preferably made of sheet metal. This member 160 is equipped with holes 161 which permit the passage of the chains 103 therethrough. This member, as will be explained hereinafter, serves to prevent air from following the chains around the end of the grate and into the furnace.

The hopper 31 includes a pair of side plates (Figs. 1, 13 and 14) 162. Secured to each of the side plates inside of the hopper is an angle iron 163. These angle irons 163 serve to guide the guillotine gate 164 in its up and down movement. The gate 164 is actuated up and down through the means of any suitable mechanism by a lever 165 (Fig. 1). Also secured to each of the side plates inside of the hopper is another angle iron 166 which serves to support and guide the bottom plate 167. This bottom plate 167 is adapted to be moved upwardly out of its position in a manner well known to those familiar with the present art, in order to permit access to the grate surface. Also secured to each of the side plates 162 in any suitable manner is a cast iron shoe member 170. Each shoe 170 comprises a tapered portion 171 and a cut-away portion 172 (Figs. 13 and 14). The end of the tapered portion 171 adjacent the cut-a-way portion 172 forms a surface 173 as shown in Figure 13. The gate 164 is adapted to be guided along the said surface 173 and the cut-away portion extends into the path of movement of the gate 164 so that the gate will rest on the bottom portion 174 of the projecting cut-away portion 172 when in its lowermost position. These shoes 170, as will become more apparent as the description progresses, due to their proximity to the grate surface are subject to intense heat by the play of the flames thereon. Heretofore, such shoes were not used and the result was that the side plates burned out in this section very quickly and necessitated the replacement of the entire side plates. These shoes take up this heat and are adapted to be very easily replaced upon wearing out, thereby saving the side plates.

Also, these shoes serve to guide the coal from the hopper 31 onto the grate surface, preventing any coal from falling down between the sides of the grate and the walls of the furnace.

Secured to the underside of the upper longitudinal beams, at the discharge end of the grate, are a plurality of baffle-like plates 105' (Fig. 4) which serve to collect ashes as they drop down and form an air seal therewith. The additional accumulation of ashes is pushed into the spaces between these plates and the ashes ahead of the additional accumulation as it builds up are crowded thereby down to the space below, this crowding of the ashes ahead by the accumulation as it collects forming and continuing an effective air seal.

The operation of the mechanism is as follows:

The traveling grate 32 (Figure 1), as is well known to those skilled with the present art, moves in the direction indicated by the arrows in Figure 1. As the top of the grate moves forward, fuel is fed thereon from the hopper 31 which is supplied with coal in any suitable manner. The feeding of the coal onto the grate surface is controlled by the feed gate 164. This gate is adjustable through the medium of a lever 165 in a well known manner. By moving it up and down, the feed of the coal onto the grate may be varied in accordance with the requirements of the furnace.

The shoes or blocks 170, not only aid in guiding the gate, but also guide the coal onto the surface of the grate, as shown in Figure 14. The coal is prevented from falling down between the sides of the grate and the associated walls of the furnace by these shoes or blocks 170. This is a very desirable feature, inasmuch as it not only prevents the waste of fuel, but also tends to maintain the coal in a position on the grate surface wherein it is not apt to fall off during its travel through the furnace. These shoes 170, as was previously pointed out, protect the lower portion of the side plates from the intense heat existing within the furnace thereby preventing the side plates 162 of the hopper from wearing out as rapidly as they have in the past. In other words, these blocks are adapted to take the play of the flame and thus prevent the corners of the side plates 162 from being burned out. This is also a very desirable feature since it is far more economical to replace the blocks than it is to replace the side plates of the hopper.

The grate 32 is of the endless chain type and is actuated at its forward or outer end by the shaft 80 through the medium of the previously described gear wheels 90. The inner or discharge end of the traveling grate, or what is frequently termed as the inner drum of the grate, comprises essentially, as was previously described, a plurality of semi-circular members 71 which constitute the end carrying members of the grate.

The teeth of the gear wheels 90 engage the rollers 140 associated with the links of the grate. In the present embodiment of my invention I have illustrated three rows of such links 121 and rollers 140 as is clearly apparent from Figure 2. With each row of links and rollers is a pair of the gear wheels 90, one of the gear wheels 90 of each pair cooperating with the rollers on one side of the links and the other gear wheel 90 of the pair cooperating with the rollers on the other side of the links.

In Figure 2 I have illustrated clearly the manner in which the rollers 140 ride on the flanges of the horizontal beams. Each of the links 121 is attached to an angle bar 120 which supports a plurality of grate bars 110. Each angle bar 120 is supported in three places,—namely, at its ends and at its center (Figure 2). This, of course, results in a very compact and strong construction. The semi-circular members 71 connect the upper longitudinal beams with the lower longitudinal beams and provide a continuous track-way for the rollers 140. That is to say, the rollers 140 in going around the bend or drum of the grate roll on the tracks 73 and 74 (Figure 5) of the members 71 and are thus conducted from the flanges of the upper beams to the flanges of the lower beams. Since the members 71 are rigidly attached to the channel iron frame work, they are enabled to maintain the links 121 in their proper position with respect to the beams.

The grate bars 110 are slid on the angle bars 120 from the ends of the angle bar and are held in place by suitable cotter pins 80 (Figure 5), one being located at each end of each angle bar. Upon removing the cotter pins, the grate bars of that angle bar may be easily slid therefrom and replaced if necessary.

In order to replace the bars with facility, it is, of course, necessary that the forward end of the grate provide a sharp enough bend so as to cause each row of grate bars, that is to say, the grate bars on each angle bar, to separate completely from the adjacent row (Fig. 1). Then by disconnecting the power from the grate and stopping the grate, the grate bars on the front angle bar may be slid therefrom and replaced or repaired as the case may be.

In operation it is desirable to maintain the discharge end of the grate closed, that is, with the adjacent edges of the bars 110 approximately meeting or overlapping to prevent displacement of the grate bars by clinkers, ashes or the like getting in between the bars. On the other hand at the front or reception end, which is not subject to this same clinker or ash clogging it is desirable that the grate bars open or separate sufficiently to permit removal of the bars without special clips, links or the like. In other words it is desired to secure an opening at the outer end without any opening at the inner end or at least a greater opening at the outer end than at the inner end.

In order to accomplish this I make the radius of the turn at the inner or discharge end of the grate greater than the radius of the turn at the outer or reception end. The spacing between the connection of one bar 110 and its link 121 and the next adjacent bar 110 and its link 121 form at least approximately chords of a circle at the front and rear turns of the grate. These chords are equal at opposite ends and as well understood equal chords subtend angles which vary inversely with the radius of the curvature. Therefore, these chords subtend a greater angle at the outer end of the grate than at the inner or larger end. The greater angle at the outer end separates the grate bars 110 at the outer end of the grate and the smaller angle at the inner end maintains the bars closed at the inner end of the grate or at least without as much separation as at the outer end.

Where I refer to the radius of turn at the ends of the grate or where I use the terms radius or curvature in the claims directed to this feature I do not intend to be limited to a true radius or to a true circle, but intend the claims to apply equally to any irregular curvatures or turns, such as might be laid out to maintain the grate properly tensioned throughout its travel about these turns.

The links 121 are not only very economical to manufacture, but make possible a very rigid and compact chain-like construction. In addition to serving to support the grate bars, they also carry the rollers 140. It should be noted that the rollers 140 are mounted upon the pins about which the links pivot and are connected to each other. A particularly noteworthy feature is the manner in which the links are attached to the angle bars. Also, it is very desirable to mount the bolts 125 in the manner illustrated clearly in Figure 9. These bolts, in addition to being easily removed from the links when it is so desired, are uniquely carried by these links and are prevented from falling out of the links by the shoulders 127 thereof.

Another feature of the present invention has to do with the slats or shutters 105, (Figure 3). Obviously, by turning the crank 100 illustrated in Figure 15, the shaft 92 may be turned thus actuating the chains 103. Through the medium of the chains 103, the position of the shutters or slats 105 may be varied with respect to the grate surface thereby enabling the control of the air admitted through the grate surface, inasmuch as the inner end of the grate is where the least air should be admitted to the grate surface, in view of the fact that practically all that remains of the fuel at the discharge end of the grate or at least all that should remain of the fuel, is ashes. By turning the shaft 92, the shutters may be interposed more or less as a barrier in the path of air admission which in combination with the ash bank or accumulation on the shutters provides in effect an air admission control or regulation.

The position which the shutters 105 may assume for adjustment thereof from the discharge end of the grate bars toward the receiving end thereof for regulating the amount of draft through the grate, is indicated in dotted lines at the upper left of the chain 103 in Figure 3.

The baffle plates 105' illustrated clearly in Figure 4, are adapted to cooperate with the shutters or slats to prevent the air from gaining entry between adjacent tracks thereby preventing such air from passing through the grate surface. These baffle plates are rigidly secured to the upper longitudinal beams and cover up the space separating the beams wherein the rollers 140 ride or travel. In other words, these plates 105' (Figure 6), are mounted below each row of links at the discharge end of the grate in such a manner as to prevent air from passing up between the beams and through the grate surface.

As previously pointed out, the angular element 160 (Figure 3), is adapted to prevent any air from following the chains or the inner surface of the rollers and links and passing up around the discharge end of the grate and then through the surface of the grate into the furnace. If it wasn't for this element 160, the purpose of the shutters and baffle plates might be frustrated.

In order to turn the handle 100 backwards (Figures 15 and 16), it is first necessary, as is obvious from the drawings, to disengage the pawl or dog 98 from the ratchet wheel 97. Then after the shaft 92 has been turned the requisite number of times, the pawl or dog 98 is moved back into engagement with the teeth of the ratchet to hold the shaft in the position in which it is placed. Also, it should be noted that inasmuch as all the sprocket wheels 102 are integral with the shaft 92, all of the chains 103 must turn with the shaft at the same time.

From the foregoing description, it is now evident that by manipulating the handle 100 the shutters 105 can be made to cover more or less of the bottom of the upper rows of grate bars comprising the grate surface to control the passage of air therethrough. Since practically all that remains of the fuel at the discharge end of the grate is ash, no air need be admitted therethrough. By employing my novel air control or shutter mechanism air can be completely prevented from passing through the grate surface at the discharge end of the grate thereby preventing a surplus of air from being admitted into the furnace as well as preventing ashes from being blown up through the chimney from the grate.

Furthermore, my air control means is one which is adapted for use under different conditions inasmuch as it is very easily adjusted in accordance with the conditions existent within the furnace. This is highly advantageous since conditions existent within a furnace vary with the type of fuel being consumed and the amount of air prevalent within the furnace.

It is thought the seven desirable qualities of my novel grate bar enumerated at the forepart of the present application are apparent from the foregoing description and that no further elucidation thereon is necessary.

I desire it understood that although I have illustrated and described specifically the preferred embodiment of my present invention that the invention is not to be limited thereby, but only insofar as defined by the scope and spirit of the appended claims.

I claim:

1. In combination, in a grate, a link having an angular depression in its top portion, rollers associated with the said link, an angle bar mounted in the said angular depression and secured to the said link by a bolt mounted within the said link, and a grate bar having a pair of opposite angular slots for receiving the ends of the legs of the said angle bar when it is slid thereon.

2. In combination, in a grate, a link having a substantially centrally disposed aperture and a lateral slot communicating therewith, an angle bar for supporting grate bars mounted on top of the said link and means positioned in the said aperture for securing the angle bar to the link.

3. In combination, in a grate, links for carrying the grate bars, rollers associated with each link, spaced trackways on which the rollers are carried and baffle plates disposed below the track for receiving the ash that drops between the grate bars and secured to the underside of the said trackways for preventing air from passing through the space separating the trackways.

4. In combination, in a grate, a frame, grate bars supported thereon, an endless chain mounted on the said frame and a plurality of slats carried by the said chain for controlling the passage of air through the grate surface.

5. A grate link having at its top a seat for a cross bar, and apertured to receive a bolt for holding the cross bar on the seat, and a shoulder on the link for underlying and supporting the head of the bolt, said link being recessed above the shoulder and having side portions along the sides of the recess for engaging the head of the bolt to hold the bolt against turning.

6. A grate link having an aperture for a bolt and a seat for a cross bar, said link being recessed at the lower end of the aperture to form a pocket with sides for holding the bolt against turning, and a bolt supporting shoulder for underlying and supporting the end of the bolt.

7. A grate link having an aperture for a bolt and a seat for a cross bar, a cross bar on said seat, a bolt passing through the aperture and holding the cross bar upon the seat, a supporting shoulder underlying the bolt, and means on said link for holding the bolt against turning.

8. In combination, a grate bar carrying link having a V-shaped depression, a V-shaped angle member seated in said depression and having projecting legs, a grate bar having angular recess means interlocked with the projecting legs of said angle member, and means for holding said angle member in said depression.

9. In combination, a grate bar carrying link having a V-shaped depression, a V-shaped angle member seated in said depression and having projecting legs, a grate bar having angular recess means interlocked with the projecting legs of said angle member, means for holding said angle member in said depression, and rollers on said carrying link.

10. In combination, a grate bar carrying link having a V-shaped depression, a V-shaped angle member seated in said depression and having projecting legs, a grate bar having angular recess means interlocked with the projecting legs of said angle member, means for holding said angle member in said depression, and a filler between the angle member and said holding means.

11. In combination, a grate bar carrying link having a V-shaped depression, a V-shaped angle member seated in said depression and having projecting legs, a grate bar having angular recess means interlocked with the projecting legs of said angle member, means for holding said angle member in said depression, said means comprising a bolt passing through the carrying link and through the base of said angle member, and engaging in a nut, and a filler between the angle member and said nut.

12. In combination, a carrying link having an angular depression, a connecting member having a base portion seated in said depression and having converging projections, a grate bar having recess means interlocking with said converging projections, and means for holding the base of said connecting member in said depression.

13. In combination a curved track, a second curved track formed on an arc of a radius greater than the radius of said first track and in spaced relation to said first named track, a traveling grate looped around said tracks with its reception end adjacent the track of lesser radius and its discharge end adjacent the track of greater radius, said grate having pivotally connected links with the grate bars free to be opened at one end by the track of lesser radius and retained in overlapping and closed relation at the other end by the track of greater radius.

14. In combination, in a grate, a frame, grate bars supported thereon, means carried by the frame at the discharge end of the grate for controlling the admission of air therethrough, and sealing means movable with respect to said frame and disposed below the top of the grate for receiving the ash that drops between the grate bars and cooperating with the said controlling means.

15. In combination, a track comprising straight portions and curved portions at each end, said curved portions being formed along arcs of different radii, an endless grate having pivotally connected meshing grate bars movable over said track, the relation between the mesh of the bars and the radii of the curves being such that the bars are unmeshed in passing over one curved portion of the track and remain in partial mesh in passing over the other.

In witness whereof, I hereunto subscribe my name this 27th day of July, 1925.

EMIL W. RITTER.